United States Patent
Slutsky et al.

(10) Patent No.: US 9,055,223 B2
(45) Date of Patent: Jun. 9, 2015

(54) DIGITAL IMAGE STABILIZATION METHOD AND IMAGING DEVICE USING THE SAME

(71) Applicant: SAMSUNG ELECTRONICS CO., LTD., Suwon-Si, Gyeonggi-Do (KR)

(72) Inventors: Michael Slutsky, Kfar Saba (IL); German Voronov, Holon (IS)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/834,730

(22) Filed: Mar. 15, 2013

(65) Prior Publication Data
US 2014/0267800 A1    Sep. 18, 2014

(51) Int. Cl.
*H04N 5/232*    (2006.01)
*G06T 7/20*    (2006.01)

(52) U.S. Cl.
CPC .............. *H04N 5/23254* (2013.01); *G06T 7/20* (2013.01)

(58) Field of Classification Search
None
See application file for complete search history.

(56) References Cited

U.S. PATENT DOCUMENTS

| | | | |
|---|---|---|---|
| 2007/0126893 A1* | 6/2007 | Wang et al. | 348/241 |
| 2008/0056613 A1* | 3/2008 | Hatanaka et al. | 382/284 |
| 2008/0144958 A1 | 6/2008 | Lee | |
| 2008/0240607 A1 | 10/2008 | Sun et al. | |
| 2008/0291300 A1* | 11/2008 | Hitomi et al. | 348/241 |
| 2009/0080790 A1* | 3/2009 | Hasegawa | 382/260 |
| 2010/0079606 A1* | 4/2010 | Batur | 348/208.6 |
| 2011/0193978 A1* | 8/2011 | Wu et al. | 348/208.6 |
| 2012/0242869 A1* | 9/2012 | Nakanishi | 348/241 |

FOREIGN PATENT DOCUMENTS

| | | |
|---|---|---|
| JP | 2001-045298 | 2/2001 |
| KR | 1998-0027711 | 1/1999 |

* cited by examiner

*Primary Examiner* — Jason Flohre
(74) *Attorney, Agent, or Firm* — Volentine & Whitt, PLLC

(57) ABSTRACT

A digital image stabilization method includes taking N frames of a target image with an exposure of T, dividing each of the N frames into predetermined blocks, and selecting a reference frame from among the N frames by setting one of the blocks in each of the N frames as a reference region and comparing reference regions of the respective N frames with one another. The method further includes estimating a motion vector of each of the remaining frames based on a reference region of the reference frame, and generating a result frame by combining a weighted frame, which is obtained by mapping a weight calculated based on the estimated motion vector to each block, and a color component frame.

14 Claims, 6 Drawing Sheets

$w_{ij} = h(i) \times h(j)$

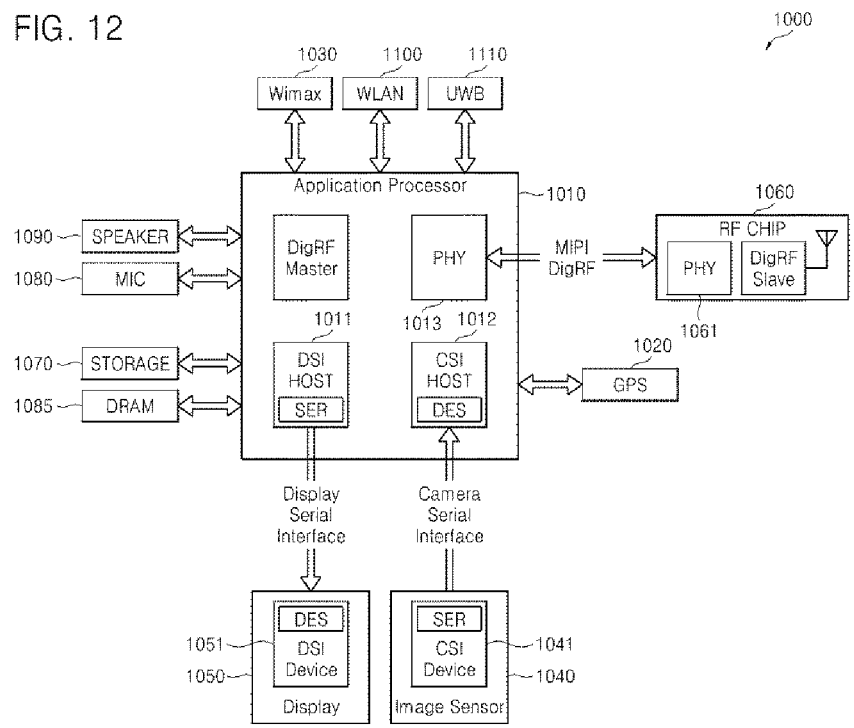

DIGITAL IMAGE STABILIZATION METHOD AND IMAGING DEVICE USING THE SAME

BACKGROUND

Embodiments of the inventive concept relate to digital imaging technology, and more particularly, embodiments of the inventive concept relate to digital image stabilization methods in which a shaken (unstable) image is compensated in order to display a non-blurred image or store the non-blurred image. Embodiments of the inventive concept also relate to imaging devices which carry out digital image stabilization methods.

Digital cameras, digital video cameras, and portable image capturing devices (collectively referred to as cameras) are used to shoot pictures or videos while being hand-held. As such, a camera may be shaken while shooting pictures or videos, which may destabilize the image processing to result in a blurred captured image.

In addition, when a user a camera to shoot an image of an object under low illumination, an image is captured with a long exposure time in order to provide image quality with an acceptable signal-to-noise ratio (SNR). When the exposure time is lengthened in response to low illumination, additional time occurs to naturally pick up unintended shakes or motions by the user. This increases the chance of a blurred captured image.

Imaging devices may be configured to estimate an unintended motion and correct an image sequence before an image is displayed. The degree of image stablization depends on the quality of camera track estimation.

SUMMARY

According to some embodiments of the inventive concept, there is provided a digital image stabilization method including taking N frames of a target image with an exposure of T; dividing each of the N frames into predetermined blocks; selecting a reference frame from among the N frames by estimating the motion between each pair of frames and choosing the one with least movement compared to others; estimating a motion vector of each of the remaining frames based on a reference region of the reference frame; and generating a result frame by combining a weighted frame, which is obtained by mapping a weight calculated based on the estimated motion vector to each block, and a color component frame.

According to other embodiments of the inventive concept, there is provided an imaging device including an image signal processor configured to receive and process raw data of each of N frames taken for an exposure time of T and to output RGB format data and Y data, a Y module configured to process the Y data of each of the N frames, a motion estimator configured to select one of the N frames as a reference frame based on the Y data and to estimate a motion of each of the remaining frames at a sum of absolute differences (SAD) value, an RGB module configured to process and store the RGB format data of each of the N frames, and a result frame generator configured to generate a result frame by weighted averaging of blocks from all frames generated based on the SAD value by the RGB format data.

BRIEF DESCRIPTION OF THE DRAWINGS

The above and other features and advantages of the inventive concept will become more apparent by describing in detail exemplary embodiments thereof with reference to the attached drawings in which:

FIG. 12 is a diagram of an electronic system including an imaging device and interface according to some embodiments of the inventive concept.

DETAILED DESCRIPTION OF THE EMBODIMENTS

Figure 1:
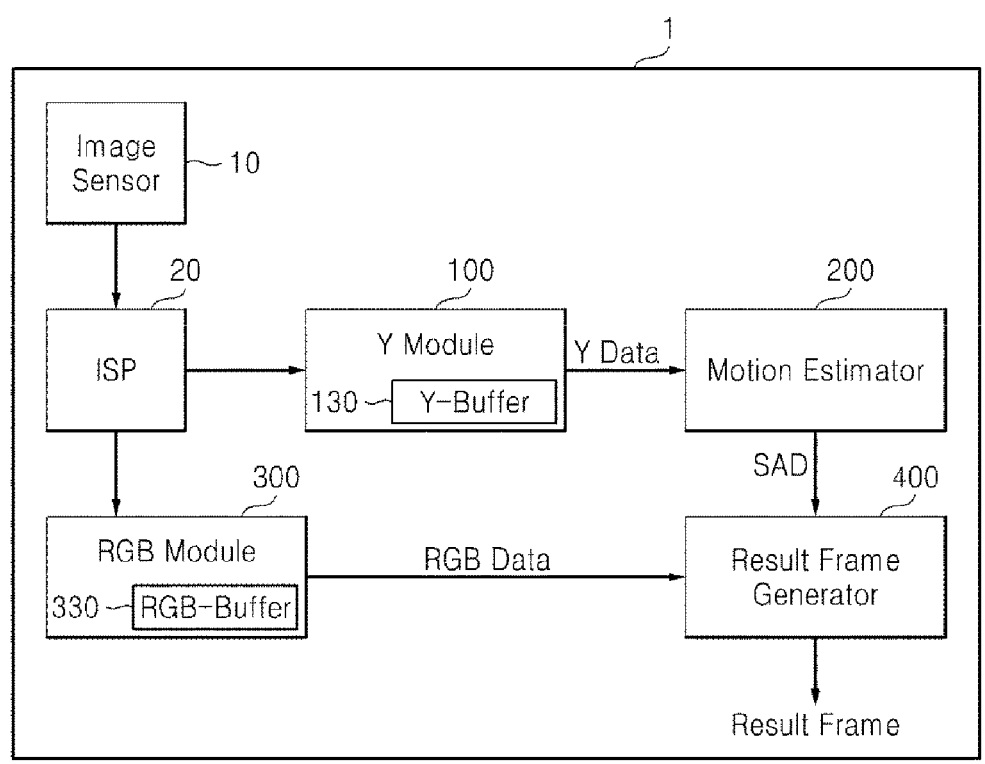
FIG. 1 is a block diagram of an imaging device according to some embodiments of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an imaging device 1 according to some embodiments of the inventive concept. The imaging device 1 takes an image, processes raw data of the image, and outputs a result frame. The result frame is displayed on a display device (not shown) or stored in a memory device (not shown). The imaging device 1 may include an image sensor 10, an image signal processor (ISP) 20, a Y module 100, a motion estimator 200, an RGB module 300, and a result frame generator 400.

The image sensor 10 senses an image pickup signal formed of incident light from a lens. In detail, the image sensor 10 senses N frames taken with respect to a target image at an exposure of T during a predetermined unit time. The frames are assumed to have a uniform exposure of T.

The ISP 20 converts an electrical signal generated by the image sensor 10 into an image signal. In other words, the ISP 20 processes raw data to output Bayer RGB format data. The raw data is affected a lot by the illumination, lens and color filter array used during shooting. Therefore, the ISP 20 performs chromatic aberration compensation or the like on the raw data.

The Y module 100 receives the raw data in the Bayer RGB format and processes it using a luminance component Y. The Y module 100 includes a Y-buffer 130 storing the luminance component Y. The Y-buffer 130 stores a Y value of each of the N frames.

The Y module 100 receives raw data and calculates a Y value. In detail, the Y module 100 performs weighted filtering ($[1\ 2\ 1]^T[1\ 2\ 1]$) on each of R, G and B components in a 3×3 pixel array in the Bayer RGB format using Equation 1:

$$Y = \frac{8G + 4R + 4B}{16}. \quad (1)$$

The R, G and B values used in Equation 1 are a weighted average of red (R) components, a weighted average of green (G) components, and a weighted average of blue (B) components, respectively, in the 3×3 pixel array. A hexadecimal value of the luminance component Y is 0 through 255 where 0 denotes brightness of 0 luxes and 255 denotes brightness of 5000 luxes or higher.

The Y value calculated using Equation 1 decreases as a distance between a pixel and a central pixel in a pixel array in the image sensor 10 increases. Therefore, nonlinear gamma correction is performed to improve the distortion of pixels located in a remote distance from the central pixel.

The luminance component Y stored in the Y-buffer 130 is a result of performing nonlinear gamma correction on a Y value of raw data. The nonlinear gamma-corrected Y value may be calculated using Equation 2:

$$p_{ed}[i] = 255 \times \frac{1 - e^{-\frac{P[i]}{pc}}}{1 - e^{-\frac{255}{pc}}}, \quad (2)$$

where P[i] is a value of an i-th pixel in the pixel array, a threshold value "pc" corresponds to 70 percent in a histogram of the raw data of a target image, and $P_{ed}[i]$ is a value of the i-th pixel that has been gamma-corrected. Gamma correction is a common technique in the art, and thus the detailed description thereof will be omitted The motion estimator 200 estimates an unwanted or unintended motion based on the Y value stored in the Y-buffer 130. The motion estimator 200 selects a reference frame from among the N frames, calculates a motion vector of each of the remaining N-1 frames based on the reference frame, and estimates an overall motion, based on sum of absolute differences (SAD). The motion estimator 200 has two main roles. The first is reference frame selection. The second is finding the matches to the blocks in the reference frame in the other frames. The motion estimator has two main roles. The first is reference frame selection. The second is finding the matches to the blocks in the reference frame in the other frames.

The RGB module 300 converts the Bayer RGB format data into RGB format data. For instance, the RGB module 300 may set white balance by adjusting the level of the R and B components, which are used to compensate for distortion caused by the color temperature of a light source, with respect to the Bayer RGB format data or may perform de-noising or de-mosaicing. The RGB module 300 includes an RGB-buffer 330, which stores the RGB format data.

The result frame generator 400 generates a result frame by reflecting the motion estimated by the motion estimator 200 to the RGB format data stored in the RGB-buffer 330.

Figure 2:
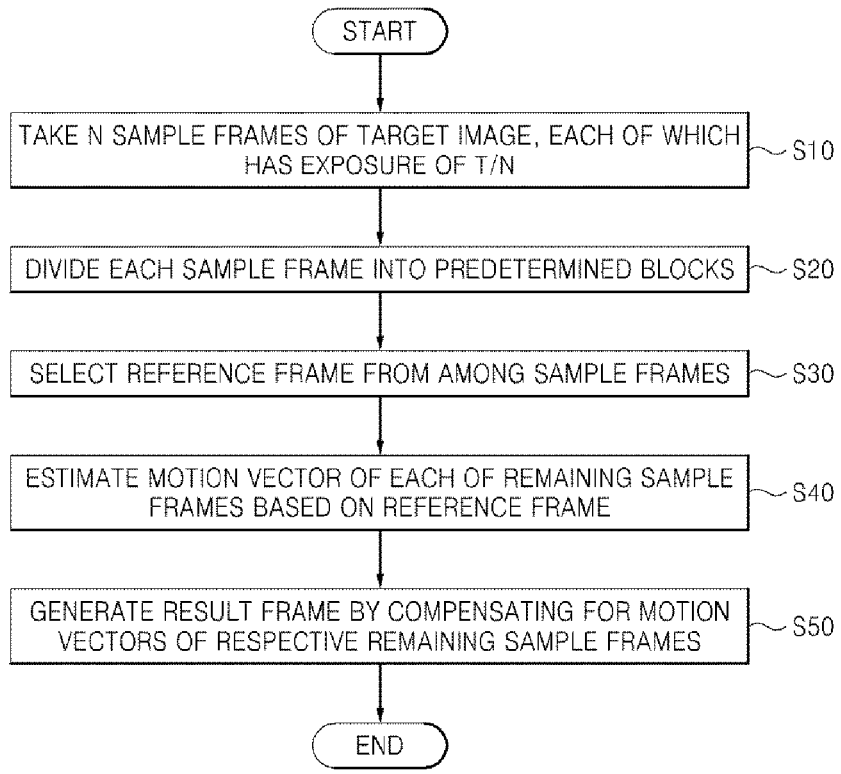
FIG. 2 is a flowchart of a digital image stabilization method according to some embodiments of the inventive concept.

FIG. 2 is a flowchart of a digital image stabilization method according to some embodiments of the inventive concept. Referring to FIG. 2, the image sensor 10 takes N sample frames of a target image at an exposure of T during a predetermined unit time in operation S10.

In order to estimate and compensate for a motion unintended by a user, each frame is divided into predetermined blocks in operation S20. In order to select a reference frame, each of the N frames is selected as a preliminary reference frame and a motion in each block in each of the remaining N-1 frames is estimated based on the preliminary reference frame in operation S30. Motion estimation is performed by calculating a motion vector of a block in the N-1 frames based on a corresponding block in the preliminary reference frame.

Motion vectors calculated with respect to the N-1 frames based on respective N preliminary reference frames are added up to an amount of motion (AOM). Among the N preliminary reference frames, a frame giving the minimum AOM is selected as a reference frame in operation S40.

The image device 1 reflects a motion vector of each block calculated based on the reference frame to RGB format data. In other words, since the motion vector is based on a Y value, a result frame with a motion compensated for by combining color components of an RGB format is output in operation S50. As a result, distortion caused by the unintended motion is compensated for, so that a sharp and clear image is obtained. Operations S10 through S50 in the digital image stabilization method will be described in detail below.

Figure 3:
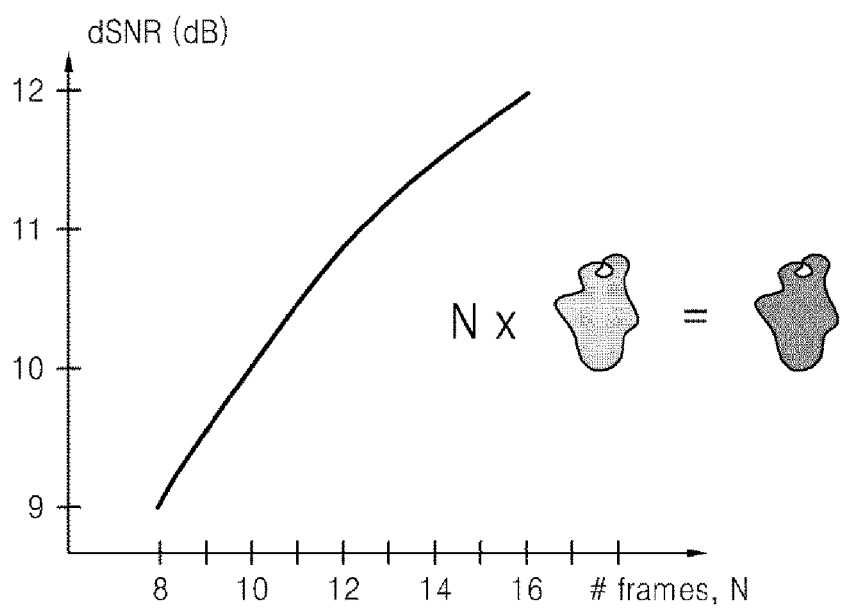
FIG. 3 is a graph of the signal-to-noise ratio (SNR) against the number of frames taken.

FIG. 3 is a graph of the signal-to-noise ratio (SNR) against the number of frames taken. The image sensor 10 takes N sample frames of a target image for an exposure time of T.

Each of the N sample frames that has an exposure time of T has lower luminance than a single frame taken at an exposure time of T*N, but it is taken with less motion than the single frame. In other words, referring to FIG. 3, as the number of sample frames increases, the SNR also increases.

Therefore, the more sample frames with exposure time T are taken (i.e. as N increases), the resulting image becomes less noisy, while keeping the sharpness of a single frame with exposure T. A single sample frame with exposure time T*N is less noisy but distorted by unintended motion blur.

Figure 4:
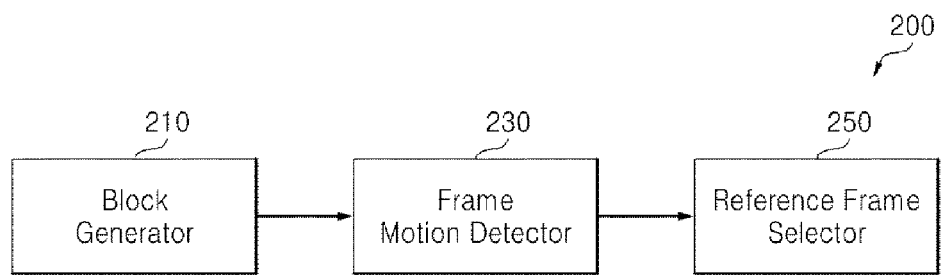
FIG. 4 is a detailed block diagram of a motion estimator illustrated in FIG. 1.
Figure 5:
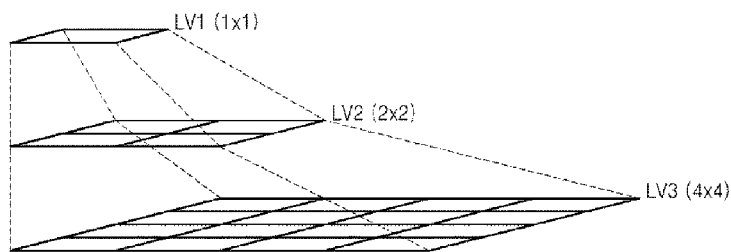
FIG. 5 is a conceptual diagram of a plurality of blocks into which a frame is divided.
Figure 6:
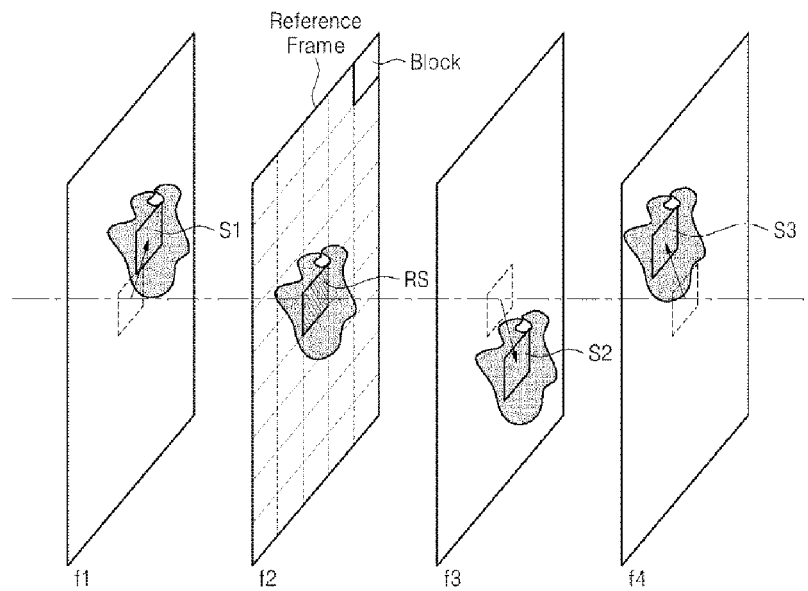
FIG. 6 is a conceptual diagram of a reference frame selected from among N frames.

FIG. 4 is a detailed block diagram of the motion estimator 200 illustrated in FIG. 1. FIG. 5 is a conceptual diagram of a plurality of blocks into which a frame is divided. FIG. 6 is a conceptual diagram of a reference frame selected from among N frames.

Referring to FIG. 4, the motion estimator 200 includes a block generator 210, a frame motion detector 230, and a reference frame selector 250.

The block generator 210 divides a frame into a plurality of blocks. FIG. 5 shows the image pyramid structure used for motion vector calculation. Each level is divided into blocks. Beginning in Level 1, motion vectors are found for each block in the current level and then propagated to the corresponding 4 blocks in the next level until the lowest level is reached.

The frame motion detector 230 detects a motion vector of a block with respect to N−1 frames based on a corresponding block in a reference frame, as shown in FIG. 6. The frame motion detector 230 detects a motion vector in each block (referred to as a search region). To detect the motion vector, a similarity measure between a reference block and a block B (S1, S2, or S3 in FIG. 6) that has shifted by the motion vector may be calculated. The similarity measurement of the block B may be defined as a SAD given by Equation 3:

$$SAD = \sum_{i,j \in B, v \in SR} |p^{ref}[i,j] - p^{curr}[i+v_x, j+v_y]|. \quad (3)$$

In other words, the similarity measure is calculated by summing the absolute difference between each pixel in the reference block and the corresponding pixels in the current image. The similarity measure is estimated in a set of positions indicated by Vx, Vy in the current image. In the embodiments in which there are 16 blocks, the similarity measurement of a block in a target image is the SAD of the block obtained by calculating $$|p^{ref}[i,j] - p^{curr}[i+v_x, j+v_y]|$$
$$|p^{ref}[i,j] - p^{curr}[i+v_x, j+v_y]|.$$

for each of the 16 blocks and adding up 16 values of
A motion vector $$\begin{pmatrix} v_x \\ y_y \end{pmatrix}$$

of a frame is defined as a minimum value among the SAD values.

In an original frame in a typical fifth-level pyramid structure, a search region substituting ±128 pixels is a half block, i.e., ±8 pixels at the highest level. A search region at each level other than the highest level is a ¼ block, i.e., ±4 pixels according to a motion vector detected at a previous level. When this is normalized, an initial displacement $v_n^S$ at an n-th level is defined as Equation 4:

$$v_n^S = \sum_{k=n+1}^{NL-1} 2^k v_k, \quad (4)$$

where $v_{NL-1}^S = \vec{0}$.

To maintain the consistency of the motion vector, 3×3 median filtering is performed on a motion vector field at the lowest level. Here, the median filtering is normal median filtering known in the art.

Referring to FIG. 6, it is assumed that a sample frame includes 40 blocks expressed by x and y. The frame motion detector 230 checks a block corresponding to the same target image (i.e., a shifted block S1, S2, or S3) among 32 blocks in each frame and detects a motion of the blocks S1, S2, and S3 in respective frames f1, f3, and f4 based on a reference region RS of a reference frame using Equation 5:

$$AOM_n = \sum_{B \in n} \sum_{F \neq n} |v_x^F(B)| + |v_y^F(B)|. \quad (5)$$

Referring to Equation 5, a total amount of motion (AOM), i.e., total amount of a distance $|v_x^F(B)|$ by which the block B (i.e., S1, S2, or S3) at the n-th level moves in an "x" direction and a distance $|v_y^F(B)|$ by which the block B moves in a "y" direction is used as an index for selecting a reference frame.

The reference frame selector 250 designates a block in one of sample frames as the reference region RS, obtains an AOM for corresponding blocks in the remaining sample frames, designates a block in another one of the sample frames as the reference region RS, obtains an AOM for corresponding blocks in the remaining sample frames, and repeats the designation and the obtaining of an AOM so that the block in every sample frame is designated as the reference region RS. The reference frame selector 250 finally selects a sample frame having the minimum AOM as the reference.

The motion estimator 200 may estimate a motion vector according to sub-pixel precision in order to increase image quality. It is assumed that fractional displacements $\partial x$ and $\partial y$ are adjusted to a minimum value of a parabolic line partially fitted in a set of SAD values near a pixel-precision motion vector.

Let's assume 3×3 blocks including a central block $(x_i, y_i)$ having a motion vector, which is defined as Equation 6:

$$(x_i, y_i) = ((\pm 1, 0), (\pm 1, 0)), \quad (6)$$

where "i" is a natural number between 0 and 8.

At this time, a parabolic surface z(x, y) may be defined as Equation 7:

$$z(x, y) = \sum_{k=0}^{5} a_k x^{n_k} y^{m_k}. \quad (7)$$

Variables k, $n_k$, and $m_k$ in Equation 7 may be as shown in Table 1.

TABLE 1

| k | 0 | 1 | 2 | 3 | 4 | 5 |
|---|---|---|---|---|---|---|
| $n_k$ | 0 | 0 | 1 | 1 | 0 | 2 |
| $m_k$ | 0 | 1 | 0 | 1 | 2 | 0 |

When a least mean square (LMS) algorithm is used, Equation 8 is defined as:

$$\frac{\partial}{\partial a_k} = \sum_i [z_i - z(x_i, y_i)]^2 = 0. \tag{8}$$

Based on Equation 7 and Equation 8 which is a differential equation with respect to $a_k$, $a_k$ may be given by Equation 9:

$$\sum_{k=0}^{5} a_k \sum_{i=0}^{8} x_i^{n_k+n_l} y_i^{m_k+m_l} = \sum_{i=0}^{8} z_i x_i^{n_l} y_i^{m_l}, \tag{9}$$

where "l" is a natural number from 0 to 5.

When $(x_i, y_i)$ in Equation 8 is replaced with other variables based on Equations 7 through 9 and Table 1, Equations 10 through 15 are given with respect to $a_k$:

$$6a_1 = \sum_i z_i y_i \equiv Z_y, \tag{10}$$

$$6a_2 = \sum_i z_i x_i \equiv Z_x, \tag{11}$$

$$4a_3 = \sum_i z_i x_i y_i \equiv Z_{xy}, \tag{12}$$

$$9a_0 + 6a_4 + 6a_5 = \sum_i z_i \equiv Z, \tag{13}$$

$$6a_0 + 6a_4 + 4a_5 = \sum_i z_i y_i^2 \equiv Z_{yy}, \text{ and} \tag{14}$$

$$6a_0 + 4a_4 + 6a_5 = \sum_i z_i x_i^2 \equiv Z_{xx}. \tag{15}$$

Based on Equations 10 through 15, $a_k$ may be defined as Equation 16:

$$a_0 = \frac{5Z}{9} - \frac{Z_{yy} + Z_{xx}}{3}$$

$$a_1 = \frac{Z_y}{6}$$

$$a_2 = \frac{Z_x}{6}$$

$$a_3 = \frac{Z_{xy}}{4} \tag{16}$$

$$a_4 = \frac{Z_{yy}}{2} - \frac{Z}{3}$$

$$a_5 = \frac{Z_{xx}}{2} - \frac{Z}{3}.$$

To make $a_k$ represent a convex parabolic surface in Equation 16, $z(x, y)$ must be positive, i.e., greater than 0; and $a_3$, $a_4$, and $a_5$ must be in the range of Equation 17:

$$4a_4 a_5 - a_3^2 > 0, \tag{17}$$

where $a_4$ and $a_5$ are positive numbers greater than 0.

Meanwhile, R-square measure may be used to evaluate the quality of the selected reference frame. When R-square measure normal in statistics is used, Equation 18 may be give as follows:

$$R^2 = 1 - \frac{\sum_i [Z_i - Z(x_i, y_i)]^2}{\sum_i [Z_i - \overline{Z}]^2} \tag{18}$$

$$\overline{Z} = \frac{1}{9} \sum_i Z_i.$$

At this time, when $R^2 > 0.8$, the selected sample frame is appropriate for the reference frame; otherwise, it cannot be the reference frame.

When $a_k$ is valid since $R^2 > 0.8$ is satisfied in Equation 18, a sub-pixel displacement may be given by Equation 19:

$$\frac{\partial}{\partial (x, y)} \sum_{k=0}^{5} a_k x^{n_k} y^{m_k} \bigg|_{\delta x, \delta y} = 0. \tag{19}$$

Equation 19 may be rewritten with respect to $a_k$ as Equation 20:

$$\begin{pmatrix} \delta x \\ \delta y \end{pmatrix} = \frac{1}{4a_4 a_5 - a_3^2} \begin{pmatrix} a_1 a_3 - 2a_4 a_2 \\ a_2 a_3 - 2a_5 a_1 \end{pmatrix}. \tag{20}$$

The equations are more relevant to the motion vector calculation of each block after the reference frame was selected.

After the appropriateness of the reference is evaluated, a motion vector between the reference region RS in the reference frame and a corresponding block in the remaining sample frames may be estimated at a similarity measurement, i.e., a SAD value. In other words, a SAD value for N−1 blocks may be obtained based on the reference region RS. At this time, two assumptions are required: the less the SAD value, the more appropriate the reference region RS; and motion vectors are generated to be compactly distributed among all reference regions SR for uniform frame acquisition conditions (e.g., illumination and exposure).

Figure 7:
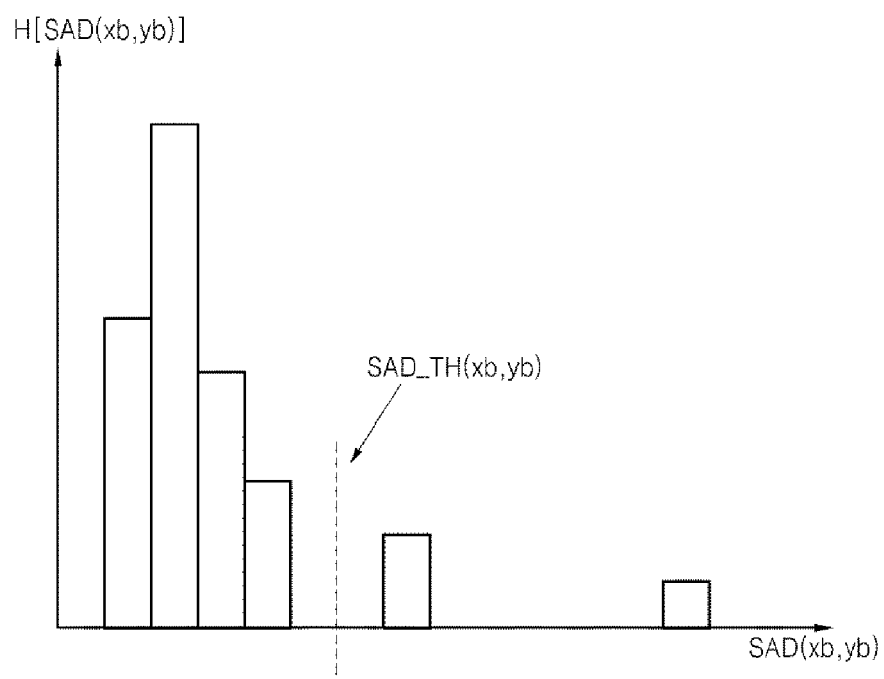
FIG. 7 is a graph showing block-similarity factor.

FIG. 7 is a graph showing block-similarity factor. Referring to FIG. 7, the result frame generator 400 obtains a SAD value for blocks in the remaining sample frames based on each of all reference regions SR in the reference frame, compares SAD values with one another, and finds a median SAD value.

In detail, the result frame generator 400 excludes motion vectors giving SAD values much greater than a predetermined threshold value and generates a weight "w" with respect to SAD values of the remaining vectors to be used for frame compensation. The weight "w" may be given by Equation 21:

$$w(SAD \in \{SAD\}_B) = \begin{cases} \exp\left[-\frac{(SAD - \min\{SAD\}_B)}{\min\{SAD\}_B + 1}\right] & \text{if } SAD < SAD_{TH}, \\ 0 & \text{otherwise.} \end{cases} \tag{21}$$

In other words, as shown in FIG. 7, motion vectors SAD_TH(xb,yb) giving SAD values much greater than the predetermined threshold value are excluded, and the weight "w" for a block corresponding to a current reference region RS in the remaining sample frames is calculated using the SAD values of the remaining motion vectors. At this time, the threshold values may be given by Equation 22:

$$SAD_{TH} = \alpha \cdot \text{median}\{SAD\}_B, \quad (22)$$

where a coefficient $\alpha$ is a value approximating 1.

When the weight "w" is obtained using Equations 21 and 22 with respect to every block of the reference frame, the weight "w" is applied to each corresponding block so that a weighted frame is generated.

Figure 8:
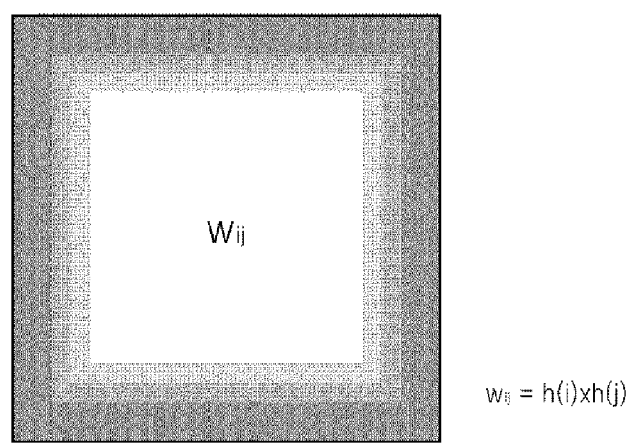
FIG. 8 is a conceptual diagram of a smoothing factor.
Figure 9:
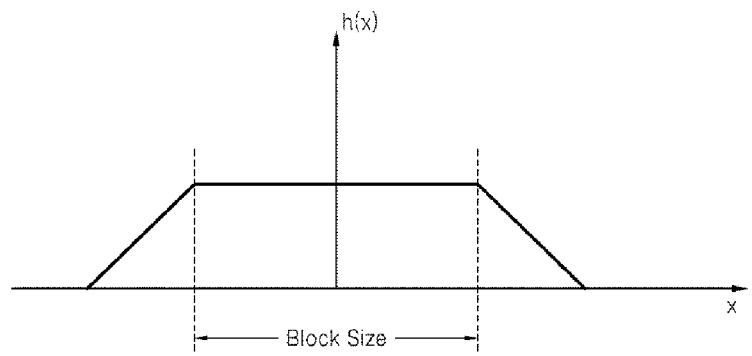
FIG. 9 is a graph of distance versus smoothing factor.
Figure 10:
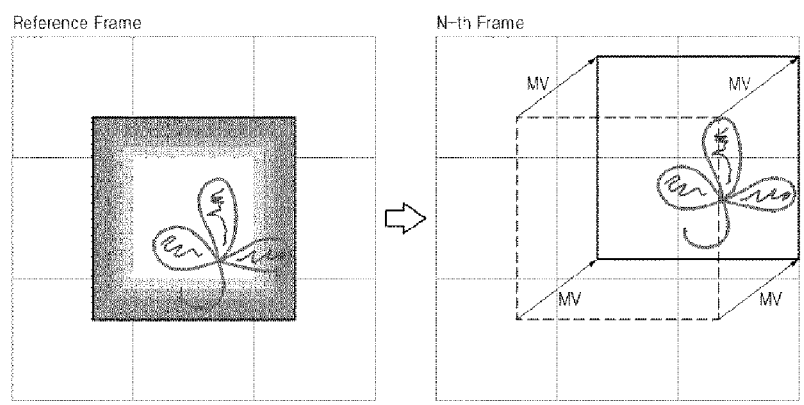
FIG. 10 is a conceptual diagram of frame composition.

FIG. 8 is a conceptual diagram of a smoothing factor "h". FIG. 9 is a graph of distance versus smoothing factor "h". FIG. 10 is a conceptual diagram of frame composition.

The result frame generator combines the RGB format data using the weights of each block in each of the frames. Each block in the resulting frame is a weighted average of the corresponding block in the reference frame and the corresponding blocks in the other frames. The weight of each block in each of the frames is as stated in [0071]. Each pixel in a block is further weighted by a factor h which decreases in the peripheral pixels of each block.

Referring to FIG. 10, each of the blocks in the reference frame in the RGB format resulting from the corrected pixel values is multiplied by a weight $w_{ij}$. At this time, the weight $w_{ij}$ corresponds to the position (i, j) of each block in the reference frame, as shown in FIG. 8, and it is obtained by multiplying the smooth factor "h" by the similarity weight "w" calculated based on SAD values in FIG. 7. In other words, as shown in FIG. 10, when a block in the N-th frame moves by MV from a reference region of the reference frame, SAD based on the motion vector MV is multiplied by the smoothing factor "h" shown in FIG. 9, generating a result frame.

The result frame generator 400 divides a result frame $p_i^{result}$ by a weighted frame $W_i^{total}$ obtained in FIG. 7 pixel by pixel, thereby performing normalization defined as Equation 23:

$$p_i^{out} = \frac{P_i^{result}}{W_i^{total}} = \frac{\sum_F p_i^F w_i^F}{\sum_F w_i^F}. \quad (23)$$

As a result, a result frame has a higher SNR than a sample frame of raw data, so that a stabilized frame can be obtained against an unintended motion. In addition, a local SNR of each block also increases.

Figure 11:
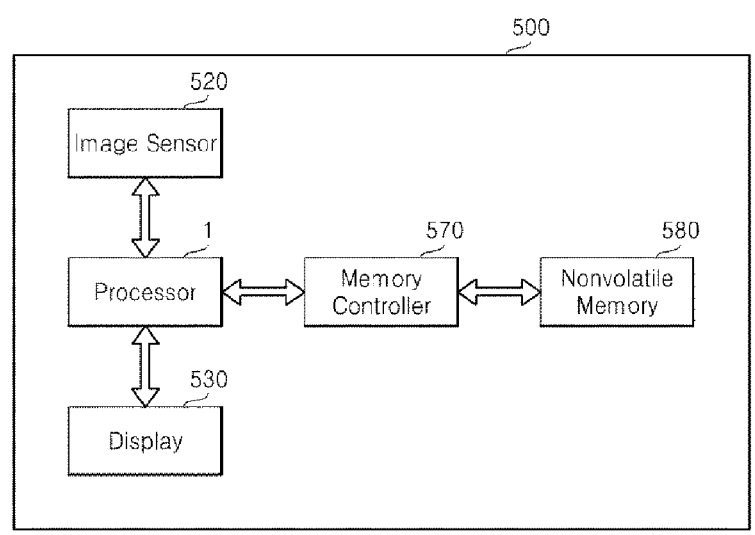
FIG. 11 is a diagram of a computer system including the imaging device illustrated in FIG. 1 according to some embodiments of the inventive concept.

FIG. 11 is a diagram of a computer system 500 including the imaging device 1 illustrated in FIG. 1 according to some embodiments of the inventive concept. Referring to FIG. 11, the computer system 500 may be implemented as an image processing device such as a digital camera or a mobile phone or smart phone equipped with a digital camera. The imaging device 1 illustrated in FIG. 1 may be implemented as a processor related with image signal processing.

The computer system 500 includes the processor 1, a memory device 580, and a memory controller 570 controlling the data processing operations, such as a write operation and a read operation, of the memory device 580. In addition, the computer system 500 includes an image sensor 520 and a display 530.

The image sensor 520 converts optical images into digital signals and outputs the digital signals to the processor 1 or the memory controller 570. According to the control of the processor 1, the digital signals may be displayed through the display 530 or stored in the memory device 580 through the memory controller 570.

Data stored in the memory device 580 may be displayed through the display 530 according to the control of the processor 1 or the memory controller 570. The memory controller 570, which may control the operations of the memory device 580, may be implemented as a part of the processor 1 or as a separate chip.

FIG. 12 is a diagram of an electronic system 1000 including an imaging device and interface according to some embodiments of the inventive concept. Referring to FIG. 12, the electronic system 1000 may be implemented as a data processing device, such as a mobile phone, a personal digital assistant (PDA), a portable media player (PMP), an internet protocol television (IPTV), or a smart phone, which can use or support mobile industry processor interface (MIPI).

The electronic system 1000 includes an application processor 1010, an image sensor 1040, and a display 1050.

A camera serial interface (CSI) host 1012 implemented in the application processor 1010 may perform serial communication with a CSI device 1041 included in the image sensor 1040 through CSI. At this time, an optical deserializer and an optical serializer may be implemented in the CSI host 1012 and the CSI device 1041, respectively. The image sensor 1040 may also include a depth sensor.

A display serial interface (DSI) host 1011 implemented in the application processor 1010 may perform serial communication with a DSI device 1051 included in the display 1050 through DSI. At this time, an optical serializer and an optical deserializer may be implemented in the DSI host 1011 and the DSI device 1051, respectively.

The electronic system 1000 may also include a radio frequency (RF) chip 1060 communicating with the application processor 1010. A physical layer (PHY) 1013 of the application processor 1010 and a PHY 1061 of the RF chip 1060 may communicate data with each other according to MIPI DigRF.

The electronic system 1000 may further include a global positioning system (GPS) 1020, a storage 1070, a microphone (MIC) 1080, a dynamic random access memory (DRAM) 1085, and a speaker 1090. The electronic system 1000 may communicate using a worldwide interoperability for microwave access (Wimax) 1030, a wireless local area network (WLAN) 1100, and an ultra-wideband (UWB) 1110.

As described above, according to some embodiments of the inventive concept, an imaging device detects a motion vector using a luminance value and generates a result frame reflecting a result of estimating the motion vector, thereby providing a frame that has a higher SNR than raw data and is stabilized against unintended motion. In addition, a local SNR of each block in the frame is increased.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A digital image stabilization method comprising:
taking N frames of a target image with an exposure of T;
dividing each of the N frames into predetermined blocks;
selecting a reference frame from among the N frames by calculating the amount of motion between each frame and the other frames and selecting the one with minimal amount of motion;
estimating a motion vector of each of the remaining frames based on a reference region of the reference frame, wherein the motion vector is a minimum among a sum of absolute differences (SAD) values each of which is obtained by comparing the reference region with a corresponding block in each of the remaining frames; and generating a result frame by combining a weighted frame, which is obtained by mapping a weight calculated based on the estimated motion vector to each block, and a color component frame.

2. The digital image stabilization method of claim 1, wherein the dividing each frame into the blocks comprises dividing each frame into the blocks in multiple levels.

3. The digital image stabilization method of claim 1, wherein the selecting the reference frame comprises:

calculating an amount of motion (AOM) value indicating how much a block corresponding to the reference region in each of N−1 frames shifts from the reference region in each of the N frames; and selecting a frame giving a minimum AOM value as the reference frame.

4. The digital image stabilization method of claim 3, wherein the selecting the reference frame further comprises checking an appropriateness of the reference frame using an R-square measure.

5. The digital image stabilization method of claim 1, wherein the generating the result frame comprises:

excluding a motion vector having a SAD value greater than a predetermined threshold value with respect each block in the reference frame; and generating a similarity weight based on SAD values of the remaining motion vectors of the reference frame.

6. The digital image stabilization method of claim 5, wherein the generating the result frame further comprises:

obtaining the weight for each block by multiplying the similarity weight by a smoothing factor after generating the similarity weight;

generating the weighted frame by mapping weights to all blocks, respectively, of the reference frame; and generating the result frame by multiplying the weighted frame by the color component frame.

7. The digital image stabilization method of claim 1, further comprising normalizing the result frame using the weighted frame.

8. An imaging device comprising:

an image signal processor configured to receive and process raw data of each of N frames taken for an exposure time of T and to output RGB format data and Y data;

a Y module configured to process the Y data of each of the N frames;

a motion estimator configured to: divide each of the frames into predetermined blocks; select one of the N frames as a reference frame based on the Y data; and estimate a motion vector of each of the remaining frames based on a reference region of the reference frame as a minimum among a sum of absolute differences (SAD) values each of which is obtained by comparing the reference region with a corresponding block in each of the remaining frames;

an RGB module configured to process and store the RGB format data of each of the N frames; and a result frame generator configured to generate a result frame by multiplying a weighted frame generated based on the SAD values by the RGB format data.

9. The imaging device of claim 8, wherein the motion estimator compares amount of motion (AOM) values obtained for the respective N frames, and selects a frame giving a minimum AOM value among the N frames as the reference frame.

10. The imaging device of claim 8, wherein the motion estimator comprises:

a block generator configured to divide each of the frames into the predetermined blocks;

a frame motion detector configured to compare the reference region with a corresponding block in each of the remaining frames; and a reference frame selector configured to select as the reference frame a frame comprising the reference region giving a minimum amount of motion (AOM) value corresponding to a total amount of motion of the corresponding block from the reference region with respect to the motion vector.

11. The imaging device of claim 10, wherein the reference frame selector checks an appropriateness of the reference frame using an R-square measure to select the reference frame.

12. The imaging device of claim 10, wherein the result frame generator generates the result frame by multiplying a weight based on the SAD values of motion vectors of the reference frame, by the RGB format data.

13. The imaging device of claim 12, wherein the weight is obtained by a smoothing factor by a similarity weight generated based on the motion vectors except for motion vectors having a SAD value greater than a predetermined threshold value.

14. The imaging device of claim 13, wherein the weighted frame is a result of mapping the weight to each of the blocks in the reference frame.

\* \* \* \* \*